United States Patent [19]

Bösebeck et al.

[11] Patent Number: 5,218,308

[45] Date of Patent: Jun. 8, 1993

[54] SENSOR FOR AND METHOD OF DETECTING THE POSITION OF A PISTON INSIDE THE CYLINDER OF A DASHPOT

[75] Inventors: Peter Bösebeck, Ennepetal; Ludger Gesenhues, Witten, both of Fed. Rep. of Germany

[73] Assignee: August Bilstein GmbH & Co. KG, Ennepetal, Fed. Rep. of Germany

[21] Appl. No.: 846,563

[22] Filed: Mar. 5, 1992

[30] Foreign Application Priority Data

Apr. 15, 1991 [DE] Fed. Rep. of Germany ....... 4112276

[51] Int. Cl.⁵ ............................................ G01R 27/26
[52] U.S. Cl. ................................... 324/654; 324/713
[58] Field of Search ................... 324/654, 657, 207.11, 324/207.16, 207.18, 207.22, 207.24; 340/870.31

[56] References Cited

U.S. PATENT DOCUMENTS 4,502,006 2/1985 Goodwin et al. ............... 324/207.16
4,627,280 12/1986 Hayashi et al. ............ 324/207.24 X
5,036,275 7/1991 Munch et al. ............... 324/207.24 X Primary Examiner—Jack B. Harvey
Attorney, Agent, or Firm—Max Fogiel

[57] ABSTRACT

A sensor for and method of continuously detecting the instantaneous position of a piston in the cylinder of a dashpot with a protective cover, for motor vehicles. The sensor consists of a cylindrical coil (9) accommodated on or in the cover (3). The coil constitutes in conjunction with the magnetizable cylinder (1) a variable inductive resistor (12). The inductive resistor is connected in series with an ohmic resistor (13). The series is subjected to a pulse voltage. The voltage drop over either resistor is rectified and measured and employed as a reference for the position of the piston (7) in the cylinder (1). The method in accordance with the invention supplies signals proportional to the stroke traveled by the piston, position signals for level control, and, by way of differentiation, signals representing motion that can be used to control the amount of vibration suppression.

9 Claims, 4 Drawing Sheets

SENSOR FOR AND METHOD OF DETECTING THE POSITION OF A PISTON INSIDE THE CYLINDER OF A DASHPOT

BACKGROUND OF THE INVENTION

The invention concerns a method of detecting the instantaneous position of a piston attached to a piston rod inside the cylinder of a dashpot in a motor vehicle. The cylinder can be magnetized. The dashpot has a protective cover coupled to the piston rod.

Dashpots of this type are employed to transfer vibrations from the surface of the road to the chassis by way of the wheel suspension. To ensure a safe and comfortable ride, such dashpots are often semi-actively or actively controlled. For such controls it is necessary to determine the various parameters of position and motion and to forward them to a processing circuit. There is an advantage to detecting the position of the piston in the cylinder. The detection results in a signal representing how far inside the cylinder the piston is. This signal can be used to regulate levels when necessary. It can also be differentiated to obtain the parameters of motion needed to control the level of vibration suppression.

German OS 3 538 349 discloses several devices for detecting the road clearance of a vehicle. One for example is a coil with primary and secondary windings mounted around the dashpot cylinder and supplied with electricity from a voltage-frequency generator. To determine the position of the piston, the magnetic flux generated by the coil is attenuated by the piston's magnetic material, and the induced currents debilitate the high-frequency signal at the ends of the coil. The drawback to this instrument is that both the piston and the electrically conductive piston rod attenuate the magnetic flux. Precise results can accordingly be attained only from forward-axle dashpots with strictly design-dictated slight variations in cross-section between the piston and the piston rod. To obtain signals that are reliable enough for processing, the cylinder must be of non-magnetic material. This sensor can accordingly be employed only with special dashpots.

Another problem is encountered in single-tube dashpots in particular. In the known sensor, the leads from the windings around the cylinder are subject to severe stress from the moving wheels while the vehicle is in operation. They are also exposed to dirt and damp.

SUMMARY OF THE INVENTION

The object of the present invention is accordingly to improve the known sensor for and method of detecting the position of a piston in a cylinder. The sensor in accordance with the invention will be simple and strong and its leads will not be subject to stress. The method will provide results that are precise enough for reliable processing.

This object is attained in accordance with the invention by a sensor for and method of continuously detecting the instantaneous position of a piston in a cylinder as recited in the claims.

There are advantages to constructing a sensor out of a cylindrical coil embedded in or mounted around the protective cover and out of a cylinder that constitutes a magnetic core. First such a sensor is easy to mount at the factory. Again, almost any model of dashpot can be adapted later just by replacing the protective cover. The sensor leads can extend out to the chassis and are not as subject to stress or exposed to splashing. The method in accordance with the invention supplies signals proportional to the stroke of the piston, position signals for controlling levels, and, by differentiation, signals representing such motions as that of the body in relation to the axle and/or the acceleration of the body. Such signals can be employed to control the level of vibration suppression.

BRIEF DESCRIPTION OF THE DRAWINGS

The invention will now be specified with reference to the accompanying drawing, wherein.

DESCRIPTION OF THE PREFERRED EMBODIMENTS

Figure 1:
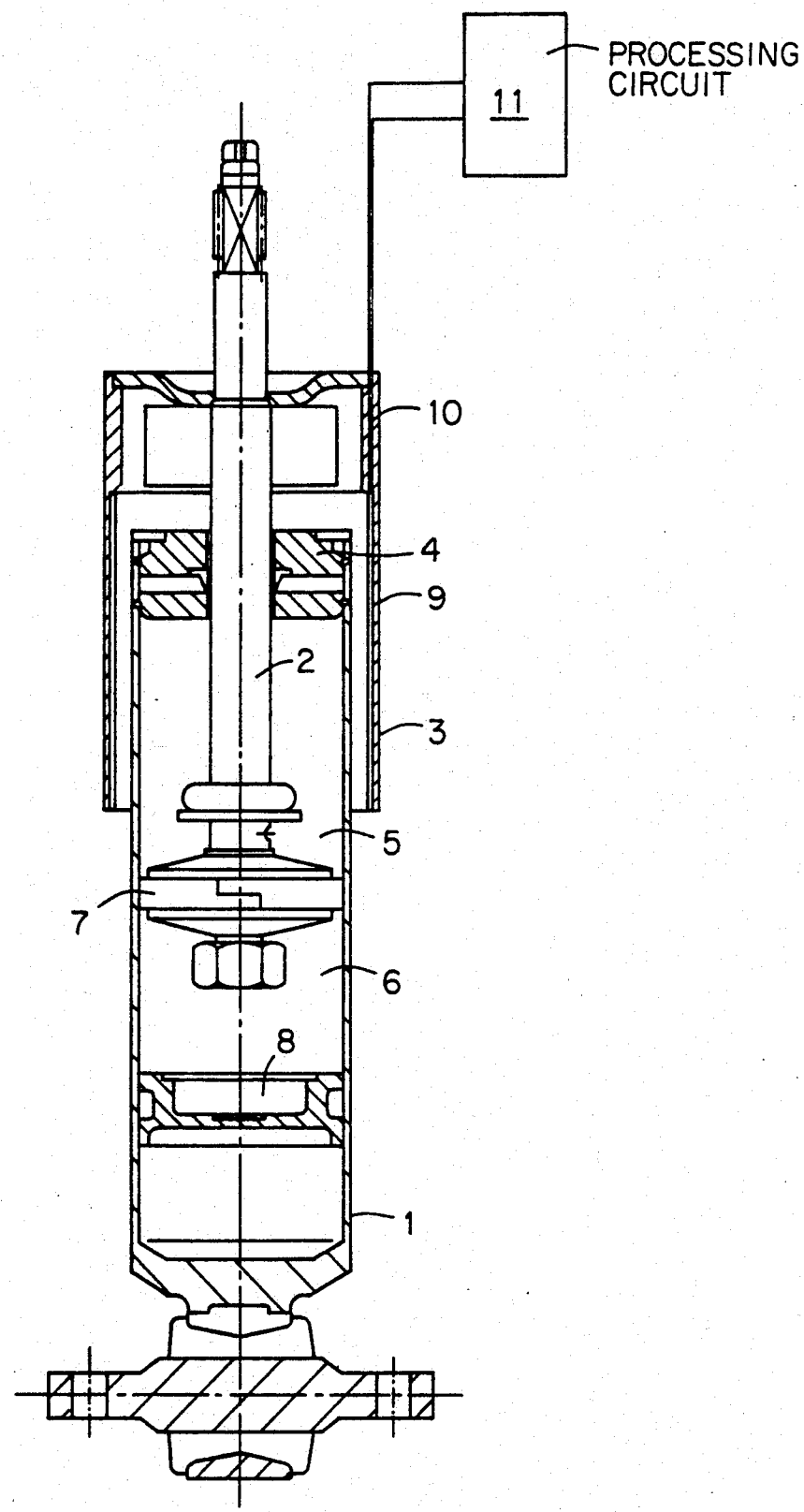
FIG. 1 illustrates a single-tube dashpot with a sensor,
FIG. 2 circuitry for carrying out the method,
FIG. 3 circuitry for carrying out the method, and
FIG. 4 the position signal.
Figure 2:
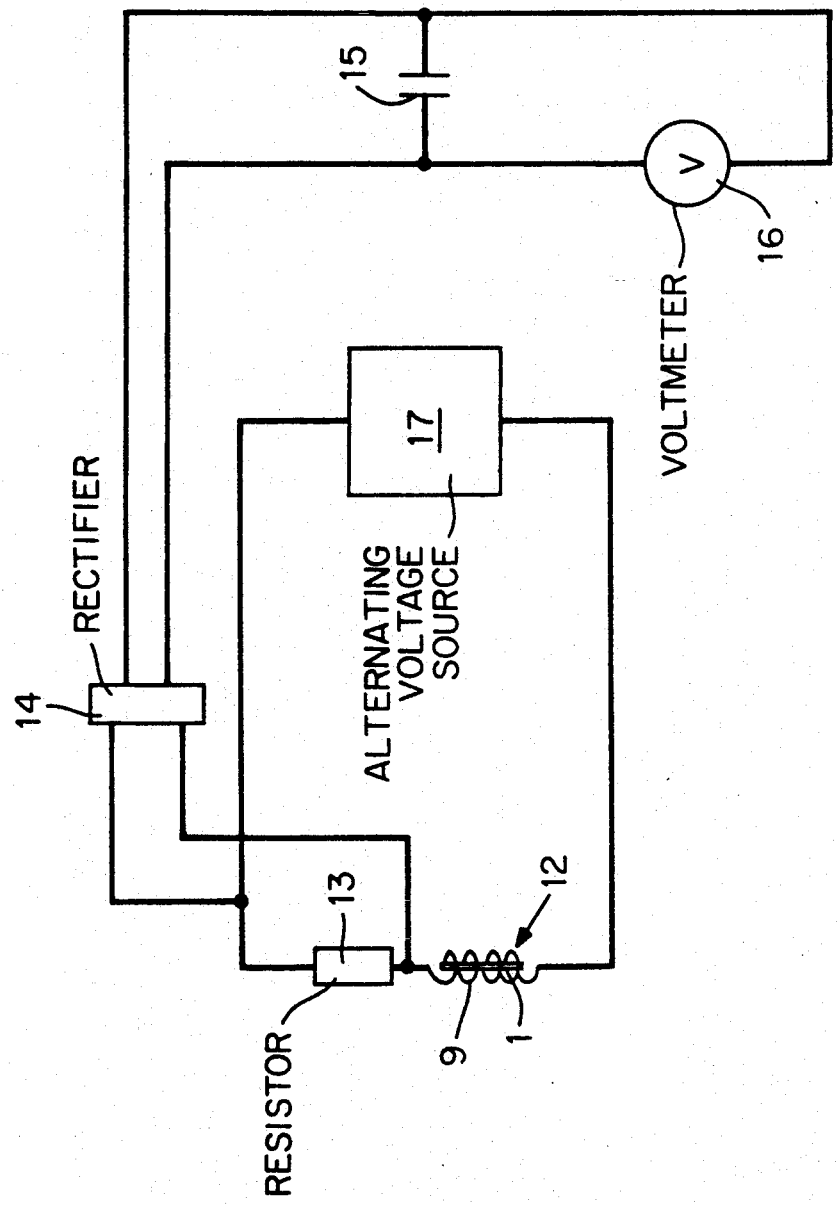

The variable hydraulic single-tube dashpot illustrated in FIG. 1 has a cylinder 1, with a perforated base 4 at one end. The cylinder is protected by a non-magnetic cover 3. The cylinder is divided into two chambers 5 and 6 by a piston 7. A piston rod 2 is secured at the bottom to piston 7 and, extending through base 4, to cover 3 at the top. The cylinder also accommodates, below piston 7, a floating piston 8. Below piston 8 is a gas-filled chamber that compensates for the increase and decrease in the capacity of the cylinder produced by piston rod 2 as it moves up and down. Cover 3 is open at one end and mounted over the cylinder. Embedded in the wall of cover 3 is a cylindrical coil 9. Coil 9 extends over the total length of cover 3 and constitutes in conjunction with the magnetizable cylinder 1 a variable inductive resistor. The electric leads 10 from coil 9 extend out toward the body of the vehicle as far as the processing circuit 11 illustrated in FIG. 2.

The inductive resistor 12 consisting of coil 9 and magnetizable cylinder 1 is connected in series to an ohmic resistor 13. A source 17 emitting a sinusoidal alternating voltage of 300 Hz for example is connected to the inductive and ohmic resistors in series.

When cylinder 1 enters coil 9 to a greater or lesser extent due to the motion of moving piston 7, which is coupled to cover 3 by way of piston rod 2, inductive resistor 12 will change. The current flowing through the two resistors in series will also vary, as will the voltage drop through ohmic resistor 13 dictated by the current. The alternating voltage will be rectified by a bridge rectifier 14 and optionally smoothed and measured by a capacitor 15. The direct voltage at the input terminal of voltmeter 16 is to a satisfactory approximation proportional to the inductivity of coil 9 as a function of the position of cylinder 1 in coil 9. The voltage also constitutes a reference for the position of piston 7 in cylinder 1.

Figure 3:
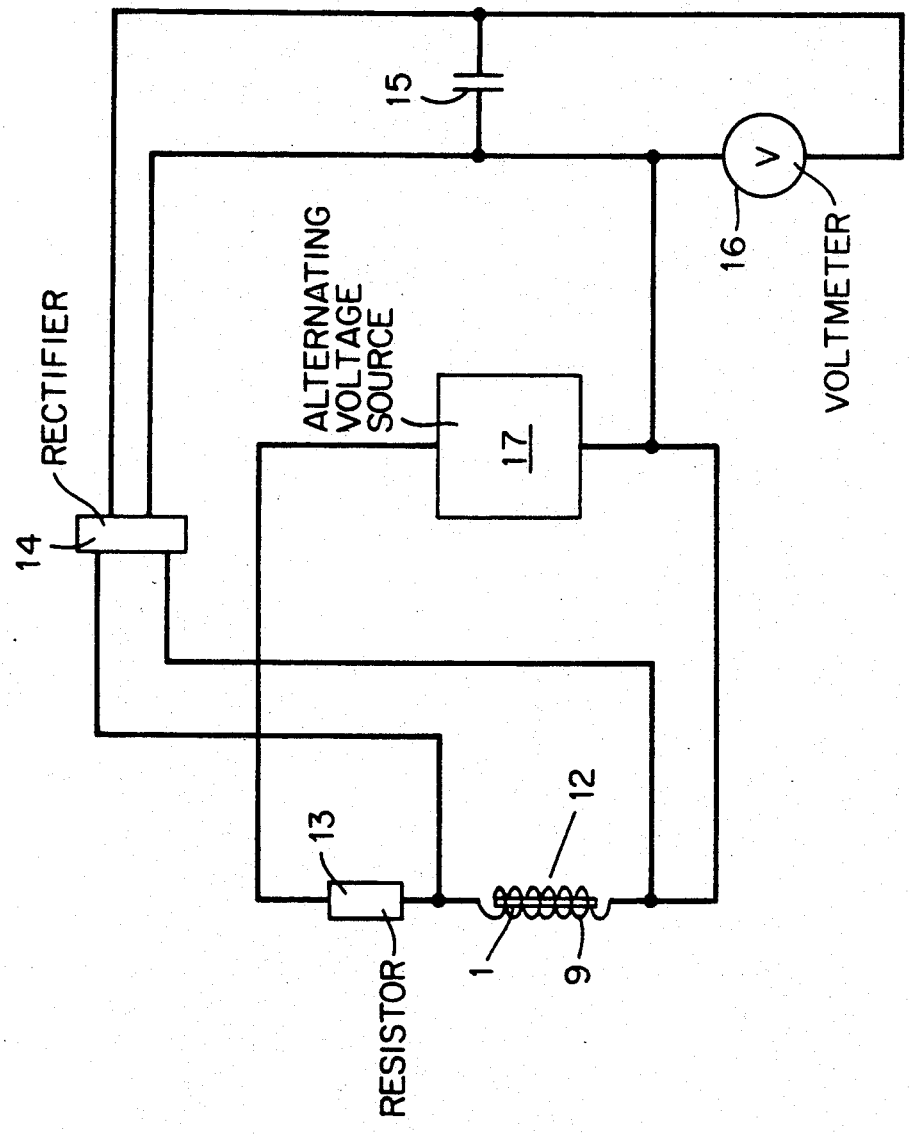

FIG. 3 illustrates another version of the processing circuitry. It functions like the circuit illustrated in FIG. 2 except that source 17 emits a pulsed direct voltage in a sinusoidal form and bridge rectifier 14 parallels inductive resistor 12. The amplitude of this voltage can be smaller. The voltage in this version varies widely, and the position of the piston can be detected even more precisely.

Figure 4:
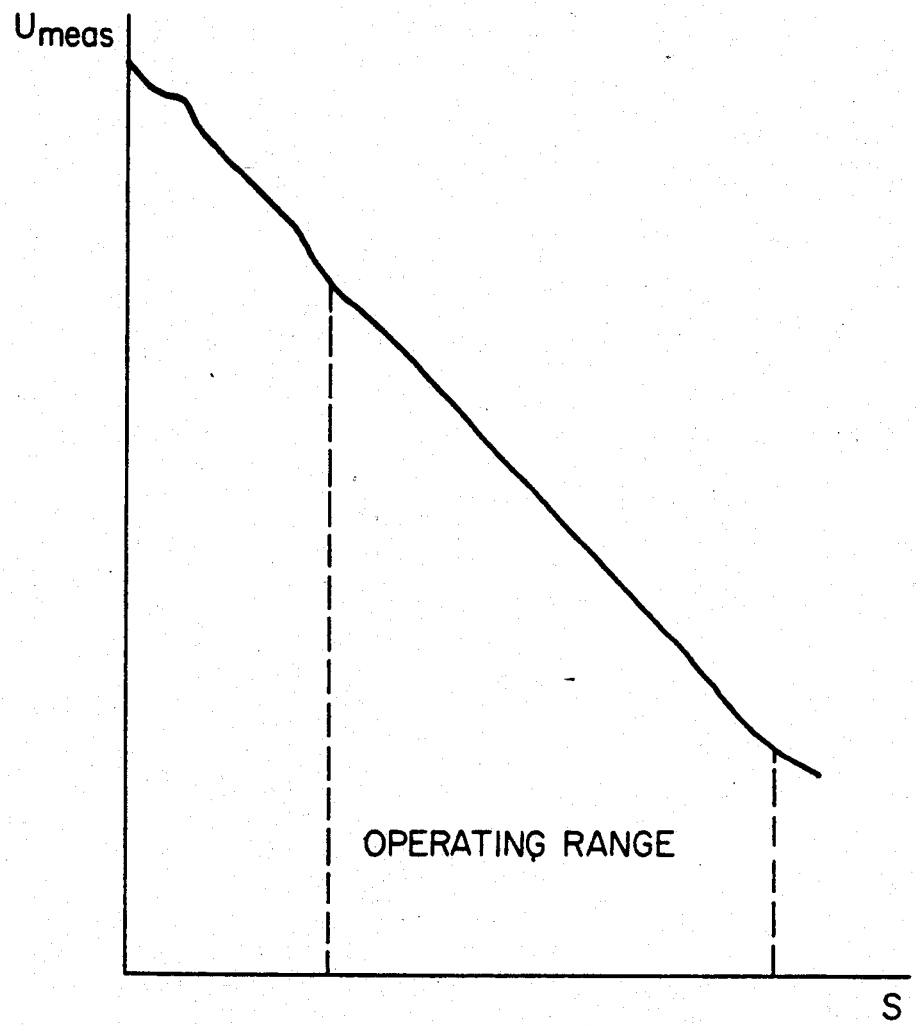

FIG. 4 clearly illustrates the proportional dependence of the measured output voltage $U_{meas}$ on the stroke s traveled by the piston inside the cylinder.

We claim:

1. A sensor in motor vehicles continuously detecting an instantaneous position of a piston in a cylinder of a dashpot, comprising: a cylinder of magnetic material; a piston with piston rod movable in said cylinder; a protective cover on said dashpot and coupled to said piston rod for moving with said piston rod; a cylindrical coil with inductive resistance in said protective cover and comprising with said cylinder a variable inductive resistor, said cover with said cylindrical coil moving with said piston relative to said magnetic cylinder to vary the inductive resistance of said coil and thereby vary current flow through said coil as well as voltage drop across said coil, said voltage drop being substantially proportional to the inductance of said cylindrical coil, said inductance being dependent on the relative position of said cylinder with respect to said coil, so that said voltage drop is a measure of the position of said piston within said cylinder, instantaneous relative velocity of said piston with respect to said cylinder being attainable by differentiating said voltage drop.

2. A method for continuously detecting an instantaneous position of a piston with piston rod within a magnetic cylinder of a dashpot in motor vehicles, comprising the steps of: providing a protective cover connected to said piston rod and movable with said piston relative to said cylinder; providing a cylindrical coil in said protective cover, said coil comprising with said cylinder a variable inductive resistor; applying a pulsed voltage to said coil; measuring a voltage drop across said coil, said cover with said cylindrical coil moving with said piston relative to said magnetic cylinder to vary the inductive resistance of said coil and thereby vary current flow through said coil as well as the voltage drop across said coil, said voltage drop being substantially proportional to the inductance of said cylindrical coil, said inductance being dependent on the relative position of said cylinder with respect to said coil, so that said voltage drop is a measure of the position of said piston within said cylinder, instantaneous relative velocity of said piston with respect to said cylinder being attainable by differentiating said voltage drop.

3. A method as defined in claim 2, including the step of smoothing said voltage drop before the step of measuring said voltage drop.

4. A method as defined in claim 2, wherein said pulsed voltage is a sinusoidal voltage.

5. A method as defined in claim 2, wherein said pulsed voltage is a pulsed direct voltage.

6. A method for continuously detecting an instantaneous position of a piston with piston rod within a magnetic cylinder of a dashpot in motor vehicles, comprising the steps of: providing a protective cover connected to said piston rod and movable with said piston relative to said cylinder; providing a cylindrical coil with a series-connected resistor in said protective cover, said coil comprising with said cylinder a variable inductive resistor; applying a pulsed voltage to said coil; measuring a voltage drop across said series-connected resistor, said cover with said cylindrical coil moving with said piston relative to said magnetic cylinder to vary the inductive resistance of said coil and thereby vary current flow through said coil as well as the voltage drop across said series-connected resistor, said voltage drop being substantially proportional to the inductance of said cylindrical coil, said inductance being dependent on the relative position of said cylinder with respect to said coil, so that said voltage drop is a measure of the position of said piston within said cylinder, instantaneous relative velocity of said piston with respect to said cylinder being attainable by differentiating said voltage drop.

7. A method as defined in claim 6, including the step of smoothing said voltage drop before the step of measuring said voltage drop.

8. A method as defined in claim 6, wherein said pulsed voltage is a sinusoidal voltage.

9. A method as defined in claim 6, wherein said pulsed voltage is a pulsed direct voltage.

* * * * *